United States Patent
Gibbons et al.

(10) Patent No.: US 8,164,855 B1
(45) Date of Patent: Apr. 24, 2012

(54) METHOD AND SYSTEM FOR PROVIDING A WRITE POLE IN AN ENERGY ASSISTED MAGNETIC RECORDING DISK DRIVE

(75) Inventors: Matthew R. Gibbons, San Jose, CA (US); Kroum S. Stoev, Pleasanton, CA (US); Yugang Wang, Milpitas, CA (US); Adam F. Torabi, Pleasanton, CA (US); Lijie Guan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 306 days.

(21) Appl. No.: 12/614,341

(22) Filed: Nov. 6, 2009

(51) Int. Cl.
*G11B 5/127* (2006.01)
(52) U.S. Cl. .................................................. 360/125.74
(58) Field of Classification Search ............... 369/13.13, 369/13.14, 13.24, 13.33; 360/59, 125.31, 360/125.4, 125.74
See application file for complete search history.

(56) References Cited

U.S. PATENT DOCUMENTS

| | | | |
|---|---|---|---|
| 6,674,594 B1 | 1/2004 | Wakabayashi et al. | |
| 6,714,370 B2 | 3/2004 | McDaniel et al. | |
| 6,944,101 B2 | 9/2005 | Johns et al. | |
| 6,944,112 B2 | 9/2005 | Challener | |
| 7,068,453 B2 | 6/2006 | Terris et al. | |
| 7,099,096 B2 | 8/2006 | Ueyanagi | |
| 7,106,935 B2 | 9/2006 | Challener | |
| 7,155,732 B2 | 12/2006 | Rausch et al. | |
| 7,215,629 B2 | 5/2007 | Eppler | |
| 7,268,973 B2 | 9/2007 | Lille et al. | |
| 7,272,079 B2 | 9/2007 | Challener | |
| 7,412,143 B2 * | 8/2008 | Rottmayer et al. | 385/129 |
| 7,440,660 B1 | 10/2008 | Jin et al. | |
| 7,603,480 B2 * | 10/2009 | Imai et al. | 709/239 |
| 7,643,248 B2 * | 1/2010 | Sluzewski | 360/234.4 |
| 8,023,225 B2 * | 9/2011 | Shimazawa et al. | 360/125.4 |
| 2003/0128633 A1 | 7/2003 | Batra et al. | |
| 2003/0235121 A1 | 12/2003 | Eppler | |
| 2004/0081031 A1 * | 4/2004 | Saga et al. | 369/13.33 |
| 2005/0190682 A1 * | 9/2005 | Gage et al. | 369/112.29 |
| 2006/0083116 A1 | 4/2006 | Rottmayer et al. | |
| 2006/0133230 A1 * | 6/2006 | Buechel et al. | 369/44.23 |
| 2006/0143635 A1 | 6/2006 | Liu et al. | |
| 2006/0181798 A1 | 8/2006 | Higuchi | |
| 2006/0187561 A1 | 8/2006 | Trunz et al. | |
| 2007/0070824 A1 * | 3/2007 | Nishida et al. | 369/13.02 |
| 2007/0139818 A1 | 6/2007 | Shimazawa et al. | |
| 2007/0159718 A1 | 7/2007 | Kim et al. | |

(Continued)

FOREIGN PATENT DOCUMENTS

WO 2004/107323 A1 12/2004

*Primary Examiner* — Angel A. Castro (57) ABSTRACT

A method and system for providing an energy assisted magnetic recording (EAMR) transducer coupled with a laser are described. The EAMR transducer has an air-bearing surface (ABS) residing in proximity to a media during use. The method and system include providing waveguide(s), a near-field transducer (NFT), write pole(s), and coil(s). The waveguide(s) direct energy from the laser toward the ABS. The NFT is coupled with the waveguide and focuses the energy onto the media. The write pole(s) include a stitch for providing a magnetic field to the media and a yoke coupled to the stitch. The stitch includes an ABS-facing surface, a sloped surface, and an NFT-facing surface between the ABS-facing and sloped surfaces. The NFT-facing surface is substantially parallel to the NFT. The sloped surface is sloped at least twenty-five and not more than sixty-five degrees with respect to the NFT-facing surface. The coil(s) energize the write pole(s).

28 Claims, 5 Drawing Sheets

U.S. PATENT DOCUMENTS

| | | |
|---|---|---|
| 2007/0165495 A1 | 7/2007 | Lee et al. |
| 2007/0177302 A1* | 8/2007 | Shimazawa et al. .......... 360/126 |
| 2007/0230048 A1* | 10/2007 | Hasegawa .................... 360/126 |
| 2008/0013912 A1 | 1/2008 | Shukh et al. |
| 2008/0043360 A1 | 2/2008 | Shimazawa et al. |
| 2008/0089187 A1 | 4/2008 | Suh et al. |
| 2008/0144206 A1 | 6/2008 | Mryasov et al. |
| 2008/0180827 A1 | 7/2008 | Zhu et al. |
| 2008/0218891 A1 | 9/2008 | Gubbins et al. |
| 2008/0232225 A1 | 9/2008 | Cho et al. |
| 2009/0052092 A1 | 2/2009 | Zhou et al. |
| 2009/0073858 A1 | 3/2009 | Seigler et al. |

* cited by examiner

Side View    Top View

METHOD AND SYSTEM FOR PROVIDING A WRITE POLE IN AN ENERGY ASSISTED MAGNETIC RECORDING DISK DRIVE

BACKGROUND

Figure 1:
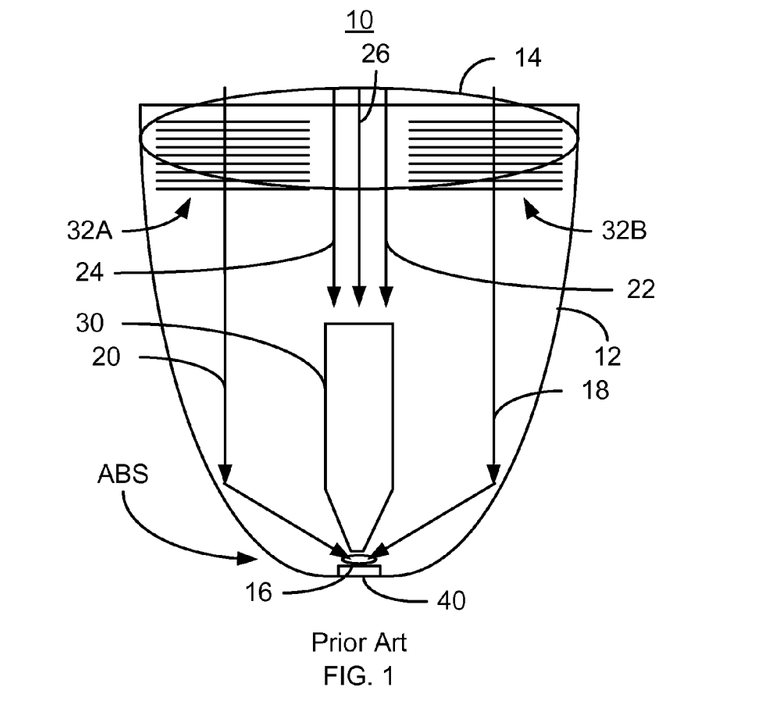
FIG. 1 depicts a side view of a conventional EAMR transducer.

FIG. 1 depicts a portion of a conventional energy assisted magnetic recording (EAMR) transducer 10. The conventional EAMR transducer 10 is used in writing a recording media (not shown in FIG. 1) and receives light, or energy, from a conventional laser (not shown in FIG. 1). The conventional EAMR transducer 10 includes gratings 32A and 32B, a conventional waveguide 12, conventional pole 30, and near-field transducer (NFT) 40. The conventional EAMR transducer 10 is shown with a laser spot 14 that is guided by the conventional waveguide 12 to a smaller spot 16 near the air-bearing surface (ABS). The light at the smaller spot 16 is focused by the NFT 40 to magnetic recording media (not shown), such as a disk. Other components that may be part of the conventional EAMR transducer 10 are not shown.

In operation, light from the spot 14 is coupled to the conventional EAMR transducer 10 using the gratings 32A and 32B. The waveguide 12, which is shown as a planar solid immersion mirror, directs light from the gratings 32A and 32B to the spot 16. In other conventional EAMR transducers, the conventional wave guides could take other forms, such as tapered waveguide that directs light toward the spot 16. The direction of travel of the light as directed by the conventional waveguide 12 can be seen by the arrows 18 and 20. A small region of the conventional media is heated by the spot 16. The conventional EAMR transducer 10 magnetically writes data to the heated region of the recording media by energizing the conventional pole 30.

Although the conventional EAMR transducer 10 may function, there are drawbacks. Design of the conventional EAMR transducer 1—seeks to balance various considerations. The NFT 16 and the pole 30 are to be separated by a particular distance. During use of the conventional EAMR transducer 10, thermal protrusion may affect the spacing between and efficacy of components in the EAMR transducer 10. This thermal protrusion may be desired to be accounted for. Further, the waveguide 12 is desired to have a high efficiency to adequately couple light from the laser (not shown in FIG. 1) to the conventional NFT 16. Often, these are competing considerations. Consequently, design of an EAMR transducer is desired to balance these competing considerations. The conventional EAMR transducer 10 may not appropriately account for these factors. More specifically, the pole 30, NFT 16, and waveguide 12 may not provide the desired combination of optical energy and magnetic field to the media. Consequently, performance of the conventional EAMR transducer may suffer.

Accordingly, what is needed is a system and method for improving performance of an EAMR transducer.

BRIEF SUMMARY OF THE INVENTION

A method and system for providing an energy assisted magnetic recording (EAMR) transducer coupled with a laser are described. The EAMR transducer has an air-bearing surface (ABS) configured to reside in proximity to a media during use. The method and system include providing at least one waveguide, a near-field transducer (NFT), at least one write pole, and at least one coil. The waveguide(s) are for directing the energy from the laser toward the ABS. The NFT is coupled with the waveguide and focuses the energy onto the media. The write pole(s) includes a stitch for providing a magnetic field to the media and a yoke coupled to the stitch. The stitch includes an ABS-facing surface, a sloped surface, and a NFT-facing surface between the ABS-facing surface and the sloped surface. The NFT-facing surface is substantially parallel to the NFT. The sloped surface is sloped at an angle of at least twenty-five degrees and not more than sixty-five degrees with respect to the NFT-facing surface. The coil(s) are for energizing the at least one write pole.

DETAILED DESCRIPTION OF THE PREFERRED EMBODIMENTS

Figure 2:
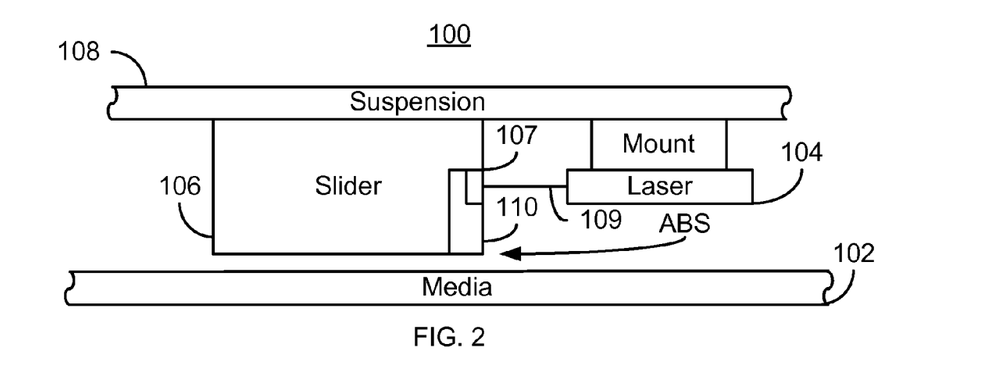
FIG. 2 depicts an exemplary embodiment of a portion of an EAMR disk drive.

FIG. 2 is a diagram depicting a portion of an EAMR disk drive 100. For clarity, FIG. 2 is not to scale. For simplicity not all portions of the EAMR disk drive 100 are shown. In addition, although the disk drive 100 is depicted in the context of particular components other and/or different components may be used. Further, the arrangement of components may vary in different embodiments. The EAMR disk drive 100 includes media 102, at least one laser 104, a slider 106, suspension 108, and at least one EAMR head 110 including one or more gratings 107. In some embodiments, the laser 104 is a laser diode. The EAMR head 110 is coupled with the laser 104. In one embodiment, the EAMR transducer is optically coupled to the laser 104 through the grating 107. Thus, line 109 represents electromagnetic energy (e.g. light) provided from the laser 104 to the grating(s) 107. In addition, although the laser 104 is shown as separately mounted to the suspension 108, in other embodiments, the laser 104 may be mounted elsewhere. For example, the laser 104 may be mounted on the slider 106 or otherwise affixed in the EAMR disk drive 100.

In addition to the grating(s) 107, the EAMR head 110 includes at least one waveguide (not explicitly shown in FIG. 2), at least one write pole (not explicitly shown in FIG. 2), at least one coil (not explicitly shown in FIG. 2), and at least one NFT (not explicitly shown in FIG. 2). The EAMR head 110 also has an ABS configured to reside in proximity to a media 102 during use. The waveguide(s) are for directing the energy from the laser 104 toward the ABS. In the embodiment shown, the energy from the laser 104 is thus coupled into the head 110, and thus the waveguide(s), by the grating(s) 107. The energy from the laser 104 then passes to the NFT, which focuses the energy to heat a small portion of the media 102.

The write pole includes a stitch that has an angled surface configured as described below. The coil is used to energize the pole(s) during writing.

Figure 3:
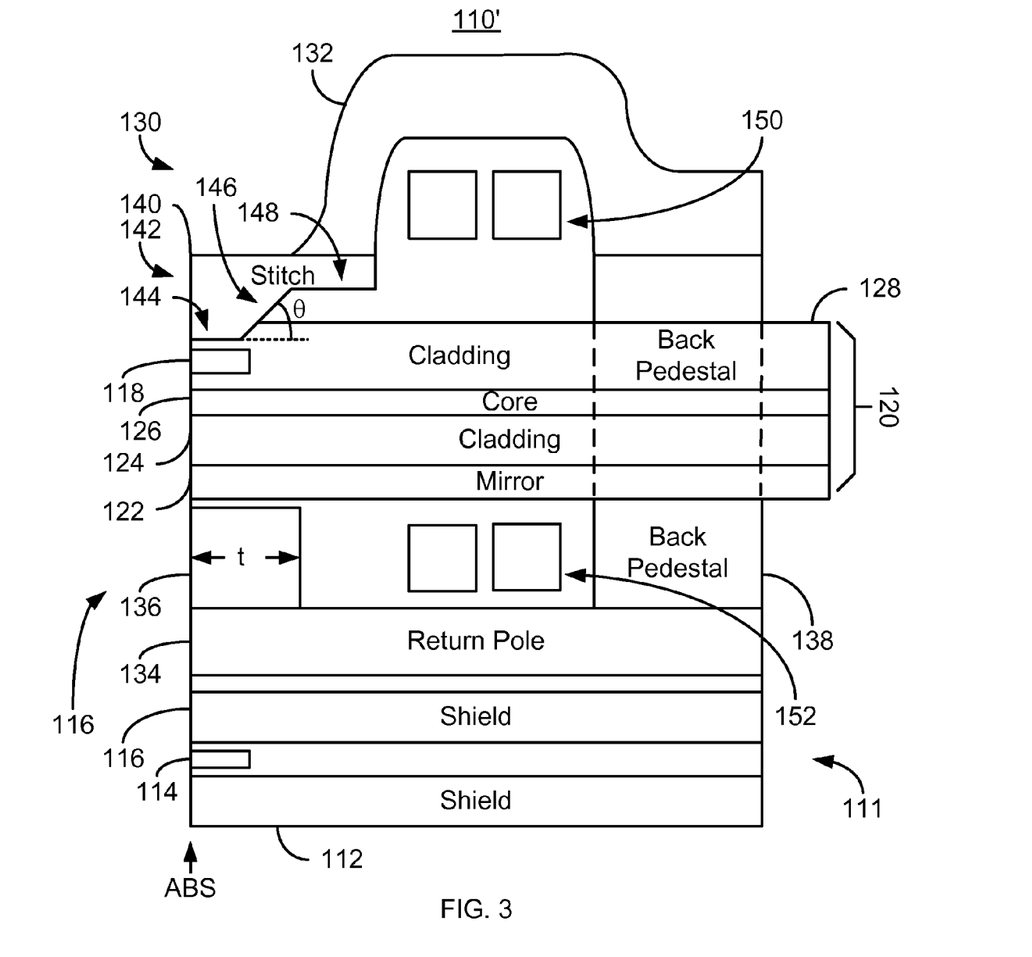
FIG. 3 depicts a side view of an exemplary embodiment of a portion of an EAMR head.

FIG. 3 depicts a side view of an exemplary embodiment of a portion of an EAMR head 110'. The EAMR head 110' may thus be used in the EAMR disk drive 100. For clarity, FIG. 3 is not to scale. For simplicity not all portions of the EAMR head 110' are shown. In addition, although the head 110' is depicted in the context of particular components other and/or different components may be used. Referring to FIGS. 2-3, the EAMR head 110' has an ABS configured to reside in proximity to the media 102 during use of the head 110'. The EAMR head 110' shown is a merged head including a read transducer 111 and an EAMR write transducer 116. The read transducer 111 shown includes shields 112 and 116 and sensor 114. However, in another embodiment, another read transducer may be used. In addition, the EAMR head 110 could simply include the EAMR transducer 116.

The EAMR transducer 116 includes an NFT 118 and a write pole 130 having yoke 132 and a stitch 140. In an alternate embodiment, the NFT 118 might be replaced with an analogous component. The EAMR transducer also includes return pole 134 with a pedestal 136, a back pedestal 138, waveguide 120 and coils 150 and 152. The coils 150 and 152 are for energizing the pole 130. In some embodiments the coils 150 and 152 might be helical, or pancake, coils. In other embodiments, the coils 152 and 154 may have a different configuration. In addition, although two turns are shown for each coil 150 and 152, another number of turns might be used. Further, another number of layers of coils might be used.

Energy from the laser 104 is coupled to the waveguide 120 through the grating(s) 107. The waveguide 120 directs energy toward the NFT 118 and, therefore, the ABS. In the embodiment shown, the waveguide 120 includes a mirror 122, cladding 124 and 128, as well as a core 126. However, in other embodiments, the waveguide 120 may include other and/or different components. In some embodiments, the waveguide 120 is a parabolic solid immersion mirror. However, in other embodiments, other configurations may be used for the waveguide 120.

As discussed above, the EAMR transducer 116 includes the back pedestal 138 and the return pole 134 having the pedestal 136. In the embodiment shown, the back pedestal 138 may block a central portion of the beam of energy directed by the waveguide 120. Thus, portions of the back pedestal 138 blocking the central portion of the light are shown by dashed lines. In another embodiment, the back pedestal 138 might includes one or more aperture(s) through which a portion of the waveguide 120 would pass. Thus, energy from the laser 104 might be more directly delivered to the ABS. In another embodiment, the waveguide 120 may then bend around the back pedestal 138 or otherwise be configured to miss the back pedestal 138.

The write pole 130 includes stitch 140 that is magnetically and physically coupled with the yoke 132. The yoke 132 is coupled with the return pole 134 through the back pedestal 138. The stitch 140 includes an ABS-facing surface 142, an NFT-facing surface 144, a sloped surface 146, and a back surface 148. In some embodiments, the back surface 148 may be omitted. The sloped surface 146 is sloped at an angle, θ, with respect to the NFT-facing surface 144. The angle θ is greater than zero degrees and less than ninety degrees. In some embodiments, θ is at least twenty-five degrees and not more than sixty-five degrees. In some embodiments of the head 110', θ is at least forty degrees and not more than fifty degrees. Because of the sloped surface 146, the bottom surface of the write pole 130 is further from the core 126 of the waveguide 120. In some embodiments, for example, the back edge of the sloped surface 146, where the sloped surface 146 meets the back surface 148 in FIG. 3, is at least four hundred nanometers from the core 126.

The NFT-facing surface 144 is substantially parallel to the top surface of the NFT 118 or analogous component. In the embodiment shown, the NFT-facing surface 144 extends in a direction substantially perpendicular to the ABS. As a result, the distance between the NFT 118 and the stitch 140 remains substantially constant along the NFT-facing surface 144. In some embodiments, the NFT-facing surface 144 extends at least fifty and not more than two hundred nanometers from the ABS.

The EAMR transducer 116, and thus the EAMR head 110', may have improved performance. The amount of magnetic material from the poles 130 and 134 in proximity to the waveguide 120 is reduced. The sloped surface 146 of the stitch 140 rises away from the waveguide 120 by the angle θ. Thus, the amount of magnetic material from the stitch 140 and yoke 132 in proximity to the core 126 of the waveguide 120 is reduced. Similarly, the return pole 134 is distal from the waveguide 120. Consequently, adverse affects on the optical efficiency of the magnetic material for the pole 130 and 134 may be reduced. Optical efficiency of the EAMR transducer 116 may be improved.

Although a portion of the magnetic material for the poles 130 and 134 is located further from waveguide 120, the stitch 140 and pedestal 136 are closer to the waveguide 120 in the region of the ABS. In particular, the NFT-facing surface 144 of the stitch 140 may be close to the NFT 118. In addition, the NFT-facing surface 144 is substantially parallel to the NFT 118. Consequently, the spacing between the NFT 118 and the pole 130/stitch 140 is small and controlled. Thus, a higher field may be achieved close to the NFT 118. The magnetic track width is determined by the region heated by NFT 118. Thus, the magnetic track width is determined by the NFT 118, rather than the width of the write pole 130. The stitch 140 may thus have relaxed size and manufacturing tolerances. Further, the use of the stitch 140 may enhance flux propagation to the media. Similarly, the pedestal 136, which is coupled with the return pole 134, allows for magnetic material to be closer to the ABS and the waveguide 120. A magnetic field sufficient for writing may be provided at the media 102 in the location of the thermal spot developed by the NFT 118. The EAMR head 110' may, therefore, have improved magnetic performance.

Thus, the sloped surface 146 allows for a balancing of optical and magnetic efficiencies. The sloped surface 146 has a sufficiently large θ that magnetic material is moved further from the waveguide core 126. Thus, optical efficiency may be improved. However, the angle θ is sufficiently small that enough magnetic field is provided to the media 102 in the region of the spot heated by the NFT 118 that the magnetic efficiency of the write pole 130 is not unduly sacrificed. As a result, the combination of the magnetic and optical efficiencies may be enhanced.

In some embodiments, the stitch 140 is configured to choke flux off from being delivered to the media after a particular write current is reached. As a result, the write field produced by the pole 130 is relatively constant for write currents in excess of this particular write current. This feature may allow for a higher data rate and reduced adjacent track interference. Consequently, drive optimization may be facilitated.

The pedestal 136 may also enhance the field at the media 102. This effect may have particular utility if the media 102 does not contain a soft underlayer. In some embodiments, the pedestal 136 may be is tens of microns wide in the cross track direction (perpendicular to the page in FIG. 3). The pedestal throat height, t, may also be optimized to increase the magnetic field in the media 102. The gap between the pedestal 136 and the pole 130 is also reduced by extending the pedestal 136 to just below the waveguide 120. As a result the pedestal 136 is tall enough to include the coil 152.

As discussed above, a parabolic solid immersion mirror may be used for the waveguide 120. In some embodiments, the back pedestal 138 passes through the waveguide 120. As a result, the center of the beam of energy from the laser 104 is blocked. However, the center of the beam generally does not interact with the mirrored sides of a parabolic solid immersion mirror. Stated differently, a parabolic solid immersion mirror does not focus the beam center. The width of the yoke 132 is narrow enough to reduce interference with light propagation through a parabolic solid immersion mirror 120. Thus, in some embodiments, substantially no adverse affects result from the narrow back pedestal 138 passing through the waveguide/parabolic solid immersion mirror 120. The blocking caused by the yoke 132 may result in a smaller, focused beam spot at the NFT 118 and ABS. In some embodiments, a mirror (not shown) may be positioned behind the yoke 132 and/or back pedestal 138 to decrease light absorption and heating in the yoke 132.

Coils 150 and 152 are used. Although described as two separate coils, the coils 150 and 152 may be two layers of a single coil. The pancake coils 152 and 154 generally do not interfere with the beam of energy near the pole 130. The pancake coils 152 and 154 are also generally efficient in coupling to the yoke 132. The two turn configuration shown in FIG. 3 may have a high frequency response because of low inductance and resistance. However, in other embodiments, another number of turns, such as a three turn configuration, may be used to increase the field at the pole 130 versus the write current used. The coils 150 and 152 are thus configured to improve performance of the head 110'.

Finally, note that the thickness of the pole 130 may be adjusted to improve performance. A thinner pole 130 may cause a slight enhancement to the field magnitude. Such an embodiment may also decreases the number of tracks exposed to the trailing edge field when the head 110' is at skew. Thus, various features of the EAMR head 110' may be used to improve overall performance of the EAMR head 110', for example by balancing optical and magnetic considerations.

Figure 4:
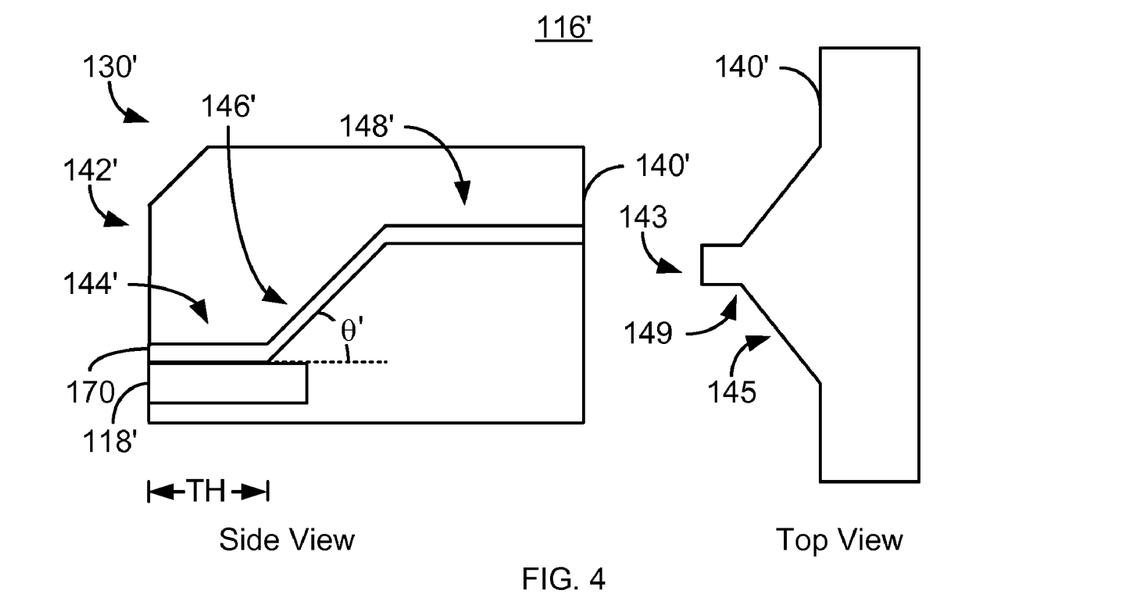
FIG. 4 depicts side and top views of an exemplary embodiment of a portion of an EAMR transducer.

FIG. 4 depicts side and top views of an exemplary embodiment of a portion of an EAMR transducer 116'. In particular, the pole 130', the stitch 140' and NFT 118' are shown. FIG. 4 is not to scale. For simplicity not all portions of the EAMR transducer 116' are shown. In addition, although the EAMR transducer 116' is depicted in the context of particular components other and/or different components may be used. Referring to FIGS. 2-4, the EAMR transducer 116' is analogous to the EAMR transducer and may be used in the disk drive 100. The EAMR transducer 116' has an ABS configured to reside in proximity to the media 102 during use of the head 110'. The EAMR transducer 116' may be used in the EAMR head 110 and/or 110'. The EAMR transducer 116' includes components that are analogous to those of the EAMR transducer 116 depicted in FIG. 3. For example, the EAMR transducer 116' includes a stitch 140' and an NFT 118'. The stitch 140' thus includes an ABS-facing surface 142', an NFT-facing surface 144', a sloped surface 146', and a back surface 148' corresponding to the ABS-facing surface 142, the NFT-facing surface 144, the sloped surface 146, and the back surface 148, respectively. The sloped surface 146' thus slopes at an angle θ' corresponding to the angle θ. Thus, the EAMR transducer 116' may share the benefits of the EAMR transducer 116.

In addition, the EAMR transducer 116' may include a connecting layer 170. The connecting layer 170 includes one or more nonmagnetic materials. As can be seen in FIG. 4, the connecting layer 170 resides between the NFT 118' and the stitch 140' of the write pole 130'. The nonmagnetic connecting material(s) have high thermal conductivities. The connecting layer 170 may thus thermally couple the NFT 118' with the stitch 140'. The pole 130' may thus act as a heat sink for the NFT 118'. Consequently, the temperature of the NFT 118' may be reduced. As a result, performance of the EAMR transducer 116' may be improved.

In some embodiments, the stitch 140' may include a nose 143 and a flared region 145. The nose 143 and the flared region 145 meet at the flare point 149. The flare point 149 may be at least fifty and not more than two hundred nanometers from the ABS. The NFT-facing 144' surface diverges from the NFT 118' at its back edge, where the NFT-facing surface 144' meets the sloped surface 146'. The throat height, TH, is the distance from the ABS to the back edge of the NFT-facing surface 144'. In some embodiments, the throat height is at least fifty and not more than two hundred nanometers. In some embodiments, the flare point 149 is the same as the throat height. However, in other embodiments, the throat height and flare point 149 differ. Thus, the throat height and flare point 149 may also be configured to enhance performance of the EAMR transducer 116'.

Figure 5:
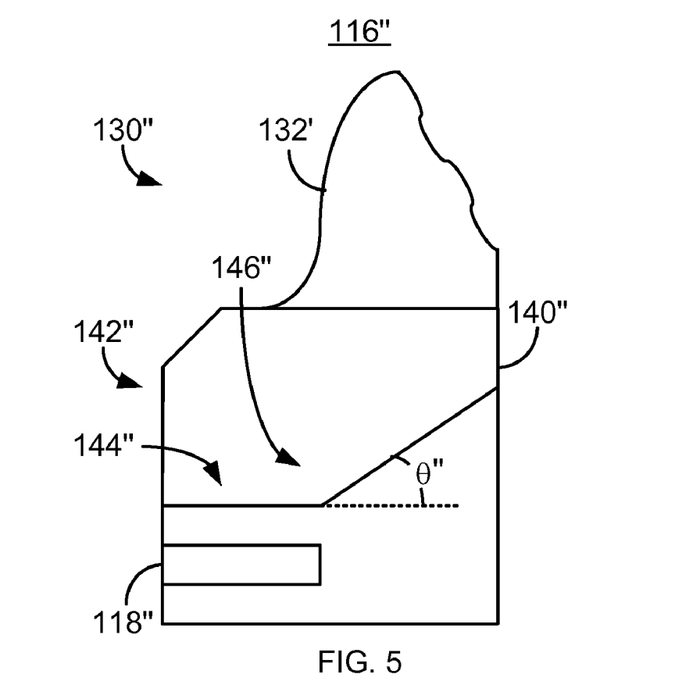
FIG. 5 depicts a side view of another exemplary embodiment of a portion of an EAMR transducer.

FIG. 5 depicts a side view of another exemplary embodiment of a portion of an EAMR transducer 116". In particular, the pole 130', the stitch 140', yoke 132', and NFT 118" are shown. FIG. 5 is not to scale. For simplicity not all portions of the EAMR transducer 116" are shown. In addition, although the EAMR transducer 116" is depicted in the context of particular components other and/or different components may be used. Referring to FIGS. 2-5, the EAMR transducer 116" is analogous to the EAMR transducers 116/116' and may be used in the EAMR disk drive 100. Thus, the transducer 116" has an ABS configured to reside in proximity to the media 102 during use of the head 110/110'. The EAMR transducer 116" may be used in the EAMR head 110/110'. The EAMR transducer 116" may include components that are analogous to those of the EAMR transducers 116 and 116'. For example, the EAMR transducer 116" includes a stitch 140", yoke 132', and an NFT 118". The stitch 140" includes an ABS-facing surface 142", an NFT-facing surface 144", a sloped surface 146", and a back surface 148" corresponding to the ABS-facing surface 142/142', the NFT-facing surface 144/144', the sloped surface 146/146', and the back surface 148/148', respectively. The sloped surface 146" thus slopes at an angle θ" corresponding to the angle θ/θ'. Although not shown, the EAMR transducer 116' may include a connecting layer such as the layer 170. In addition, the EAMR transducer 116" may include a nose (not explicitly labeled), a flare point (not explicitly labeled), and a flared region (not explicitly labeled) that are analogous to the nose 143, the flare point 149, and the flared region 145, respectively. Thus, the EAMR transducer 116" may share the benefits of the EAMR transducers 116 and/or 116'.

Although analogous to the stitches 140/140', the stitch 140" does not have a back surface analogous to the back surfaces 148/148'. Stated differently, there is no surface substantially parallel to the NFT-facing surface 144' that is both at the leading edge of the stitch 140" and that is distal from the ABS-facing surface 142". In another embodiment, the stitch 140" might have a back surface (not shown) that is not parallel to the NFT-facing surface 144'. Thus, in addition to sharing the benefits of the EAMR transducers 116/116', the transducers 116" allows for flexible configuration of the stitch 140".

Figure 6:
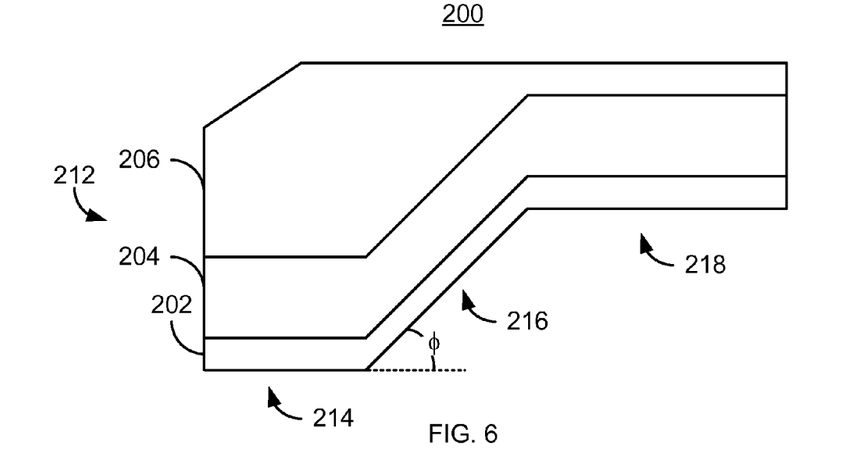
FIG. 6 depicts a side view of another exemplary embodiment of a portion of an EAMR transducer.

FIG. 6 depicts a side view of another exemplary embodiment of a portion of an EAMR transducer. In particular, a stitch 200 is shown. FIG. 6 is not to scale. Although the stitch 200 is depicted in the context of particular components other and/or different components may be used. Referring to FIGS. 2-6, the stitch 200 is analogous to the stitches 140/140'/140" and may be used EAMR transducers 116/116'/116", the EAMR heads 110/110', and the EAMR disk drive 100. Thus, the stitch 200 has an ABS-facing surface 212, an NFT-facing surface 214, a sloped surface 216, and an optional back surface 218. The ABS-facing surface 212, the NFT-facing surface 214, the sloped surface 216, and the back surface 218 correspond to the ABS-facing surfaces 142/142'/142", the NFT-facing surfaces 144/144'/144", the sloped surfaces 146/146'/146", and the back surfaces 148/148', respectively. The sloped surface 216 forms an angle, φ, with the NFT-facing surface 214. The angle φ is analogous to the angles θ/θ'/θ". Although not shown, a connecting layer such as the layer 170 may be used. In addition, the stitch 200 may include a nose (not explicitly labeled), a flare point (not explicitly labeled), and a flared region (not explicitly labeled) that are analogous to the nose 143, the flare point 149, and the flared region 145, respectively. Thus, an EAMR transducer using the stitch 200 may share the benefits of the EAMR transducers 116/116'/116".

In addition, the magnetic moment of the stitch 200 varies. In some embodiments, the stitch 200 includes layers 202, 204, and 206. The layers 202, 204, and 206 may have different magnetic moments. In some embodiments, the layer 202 at the leading edge of the stitch 200 has the highest moment. In some such embodiments, the moments of the layers 202, 204, and 206 decrease with increasing distance from the leading edge. Thus, the layer 204 may have a higher moment than the layer but a lower moment than the layer 202. The layer 206 has a lower moment than both layers 202 and 204. For example, in some embodiments, the layer 202 may be a high moment sputtered material that functions as a seed for subsequent plated layers. Layers 204 and 206 may be plated and have lower moments than the layer 202. Although shown as separate layers, the stitch 200 could be formed by a single material having varying moments. For example, the composition of an alloy may be varied based on the distance from the leading edge such that the moment decreases with increasing distance from the leading edge.

Thus, the stitch 200 has a higher moment in proximity to an NFT (not shown in FIG. 6). Thus, the higher moment layer 202 is closest to the portion of the media (not shown) currently being written. The layers 204 and 206 closer to the trailing edge of the pole using the stitch 200 have lower moments. This feature may decrease the magnetic field at the trailing edge of the pole. The trailing edge field is thus less likely to affect previously written tracks that are either on track or on adjacent tracks. Consequently, adjacent track interference that degrades previously written tracks may be reduced. Consequently, performance of the EAMR transducer using the stitch 200 may be further enhanced.

Figure 7:
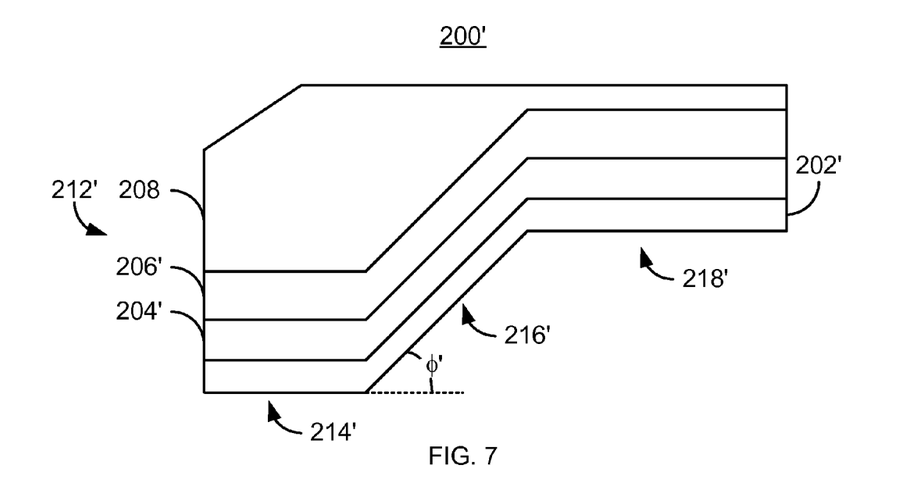
FIG. 7 depicts a side view of another exemplary embodiment of a portion of an EAMR transducer.

Although three layers 202, 204, and 206 are shown in FIG. 6, another number of layers may be used. For example, two layers having different moments may be used in lieu of three. In other embodiments additional layers might be used. For example, FIG. 7 depicts a side view of another exemplary embodiment of an EAMR transducer. In particular, a stitch 200' is shown. FIG. 7 is not to scale. Although the stitch 200' is depicted in the context of particular components other and/or different components may be used. Referring to FIGS. 2-7, the stitch 200' is analogous to the stitches 140/140'/140"/200 and may be used EAMR transducers 116/116'/116", the EAMR heads 110/110', and the EAMR disk drive 100.

The stitch 200' has an ABS-facing surface 212', an NFT-facing surface 214', a sloped surface 216', and an optional back surface 218'. The ABS-facing surface 212', the NFT-facing surface 214', the sloped surface 216', and the back surface 218' correspond to the ABS-facing surfaces 142/142'/142"/212, the NFT-facing surfaces 144/144'/144"/214, the sloped surfaces 146/146'/146"/215, and the back surfaces 148/148'/218, respectively. The sloped surface 216' forms an angle, φ', with the NFT-facing surface 214'. The angle φ' is analogous to the angles θ/θ'/θ"/φ. Although not shown, a connecting layer such as the layer 170 may be used. In addition, the stitch 200' may include a nose (not explicitly labeled), a flare point (not explicitly labeled), and a flared region (not explicitly labeled) that are analogous to the nose 143, the flare point 149, and the flared region 145, respectively. Thus, an EAMR transducer using the stitch 200' may share the benefits of the EAMR transducers 116/116'/116"/200.

In addition to the layers 202', 204', and 206', the stitch 200' also includes layer 208. The layers 202', 204', 206', and 208 may have different magnetic moments. In some embodiments, the layer 202' at the leading edge of the stitch 200' has the highest moment. In some such embodiments, the moments of the layers 202', 204', 206' and 208 decrease with increasing distance from the leading edge. Thus, the layer 204' may have a higher moment than the layer but a lower moment than the layer 202'. The layer 206' has a lower moment than layer 204' but higher than layer 208. The layer 208 may have the lowest moment of all layers 202', 204', 206', and 208. In some embodiments, the layer 202 may be a high moment sputtered material that functions as a seed for subsequent plated layers 204, 206, and 208.

The stitch 200' shares the benefits of the stitch 200. Thus, the magnetic field from the stitch 200' may be more concentrated in proximity to an NFT, near the leading edge of the stitch 200'. Thus, an EAMR transducer using the stitch 200' may provide sufficient magnetic field for writing to the media, while being less likely to adversely affect previously written adjacent tracks. Consequently, performance of an EAMR disk drive, EAMR head, and/or EAMR transducer using the stitch 200' may be improved.

Figure 8:
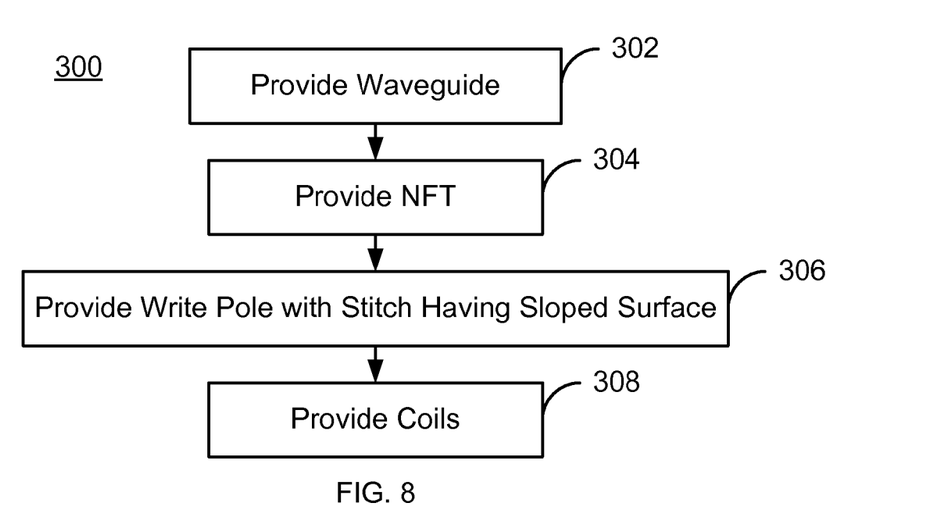
FIG. 8 depicts an exemplary embodiment of a method of forming a portion of an EAMR transducer.

FIG. 8 depicts an exemplary embodiment of a method 300 of forming a portion of an EAMR transducer. For simplicity, some steps may be omitted, combined, and/or performed in another sequence. The method 300 is described in the context of the EAMR transducer 116'. However, the method 300 may be used to fabricate other EAMR transducers. In addition, the method 300 is described in the context of fabricating a single transducer 116'. However, multiple transducers may be fabricated substantially in parallel. The method 300 also starts after formation of a portion of the EAMR transducer 116'. Other structures may also be fabricated as part of formation of the transducer 116'. Further, although described as separate steps, portions of the method 300 may be interleaved as the transducer 116' may be manufactured layer by layer.

At least one waveguide 120 for directing the energy from the laser 104 toward the ABS is provided, via step 302. Step 302 may thus include fabricating the mirror 122, cladding 124 and 128, and the core 126. Thus, a parabolic solid immersion mirror might be fabricated in step 302. The NFT 118' is provided, via step 304. The NFT 118' is optically coupled with the waveguide 120 and is for focusing the energy from the laser onto the media 102.

The write pole 130 is provided, via step 306. Step 306 thus includes fabricating the stitch 140 and the yoke 132. In addition, the ABS-facing surface 142, a sloped surface 146, and the NFT-facing surface 144 between the ABS-facing surface 142 and the sloped surface 146 are formed. In some embodiments, the back surface 148 is also manufactured. The coils 150 and 152 are also provided, via step 308. Fabrication of the EAMR transducer 116' may then be completed. Thus, using the method 300, the benefits of the EAMR transducer 116' may be achieved.

Figure 9:
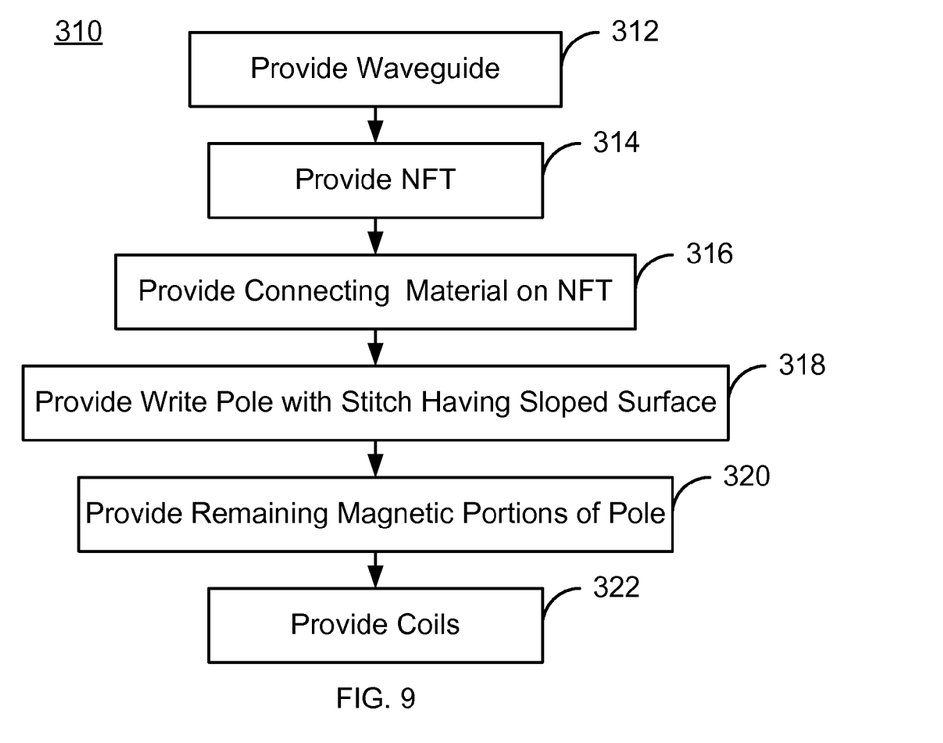
FIG. 9 depicts an exemplary embodiment of another method of forming a portion of an EAMR transducer.

FIG. 9 depicts an exemplary embodiment of another method 310 of forming a portion of an EAMR transducer. For simplicity, some steps may be omitted, combined, and/or performed in another sequence. The method 310 is described in the context of the EAMR transducer 116' and the stitch 140/140'/140"/200/200'. However, the method 310 may be used to fabricate other EAMR transducers. In addition, the method 310 is described in the context of fabricating a single transducer 116'. However, multiple transducers may be fabricated substantially in parallel. The method 310 also starts after formation of a portion of the EAMR transducer 116'. Other structures may also be fabricated as part of formation of the transducer 116'. Further, although described as separate steps, portions of the method 310 may be interleaved as the transducer 116' may be manufactured layer by layer.

At least one waveguide 120 for directing the energy from the laser 104 toward the ABS is provided, via step 312. Step 312 is analogous to step 302. The NFT 118' is provided, via step 314. Step 314 is analogous to step 304.

The connecting layer 170 may be provided on the NFT 118/118', via step 316. Thus, the NFT 118/118' may be thermally coupled to the pole 130/130'. The write pole 130 is provided, via step 318. Step 318 thus includes fabricating the stitch 140/140'/140"/200/200' and the yoke 132/132'/132". The remaining magnetic portions of the transducer 116/116' may be fabricated, via step 320. Thus, the poles 130 and 134, the pedestal 136, and the back pedestal 138 may be formed. The coils 150 and 152 are also provided, via step 322. Fabrication of the EAMR transducer 116' may then be completed. Thus, using the method 310, the benefits of the EAMR transducer 116' may be achieved.

We claim:

1. An energy assisted magnetic recording (EAMR) head coupled with a laser for providing energy and having an air-bearing surface (ABS) configured to reside in proximity to a media during use, the EAMR head comprising:
    at least one waveguide for directing the energy from the laser toward the ABS;
    a near-field transducer (NFT) coupled with the waveguide for focusing the energy onto the media;
    a write pole including a stitch for providing a magnetic field to the media and a yoke coupled to the stitch, the stitch including an ABS-facing surface, a sloped surface, and a NFT-facing surface between the ABS-facing surface and the sloped surface, the NFT-facing surface being substantially parallel to the NFT, the sloped surface being sloped at an angle of at least twenty-five degrees and not more than sixty-five degrees with respect to the NFT-facing surface; and
    at least one coil for energizing the write pole.

2. The EAMR head of claim 1 wherein the angle is at least forty degrees and not more than fifty degrees.

3. The EAMR head of claim 1 wherein NFT-facing surface extends at least fifty and not more than two hundred nanometers from the ABS.

4. The EAMR head of claim 1 wherein the write pole further includes:
    a back pedestal and a return pole, the stitch being coupled to the back pedestal through the yoke.

5. The EAMR head of claim 1 wherein the stitch includes a nose and a flared region, the nose meeting the flared region at a flare point, the NFT facing surface meeting the sloped surface at a throat height, the throat height being the same as the flare point.

6. The EAMR head of claim 1 wherein the stitch includes a nose and a flared region, the nose meeting the flared region at a flare point, the NFT facing surface meeting the sloped surface at a throat height, the throat height being different from the flare point.

7. The EAMR head of claim 1 wherein the stitch includes a nose and a flared region, the nose meeting the flared region at a flare point, the flare point being at least fifty and not more than two hundred nanometers from the ABS.

8. The EAMR head of claim 1 wherein the waveguide includes a core and wherein the sloped surface includes a back edge distal from the ABS, the back edge being at least four hundred nanometers from the core.

9. The EAMR head of claim 1 wherein the stitch includes a plurality of moments.

10. The EAMR head of claim 9 wherein the stitch includes a plurality of layers, each of the plurality of layers having a moment of the plurality of moments, a first layer being disposed at a leading edge of the write pole, the first layer including the NFT-facing surface and the sloped surface, the first layer having a highest moment of the plurality of moments.

11. The EAMR head of claim 10 wherein the moment of each of the plurality of layers decreases with increasing distance from the leading edge.

12. The EAMR head of claim 1 wherein the waveguide further includes a parabolic solid immersion mirror.

13. The EAMR head of claim 1 further comprising:
    a nonmagnetic connecting material residing between the NFT and the write pole, the nonmagnetic connecting material having a high thermal conductivity.

14. An energy assisted magnetic recording (EAMR) head coupled with a laser for providing energy and having an air-bearing surface (ABS) configured to reside in proximity to a media during use, the EAMR head comprising:
    at least one waveguide for directing the energy from the laser toward the ABS, the at least one waveguide includes a core;
    a near-field transducer (NFT) coupled with the waveguide for focusing the energy onto the media;
    a write pole including a stitch for providing a magnetic field to the media, a yoke coupled to the stitch, a back pedestal coupled to the yoke and a return pole coupled to the back pedestal, the return pole including a pedestal, the stitch including an ABS-facing surface, a back surface, a sloped surface, and an NFT-facing surface between the ABS-facing surface and the sloped surface, the sloped surface being between the NFT-facing surface and the back surface, the stitch further including a nose and a flared region, the nose meeting the flared region at a flare point, the flare point being at least fifty nanometers and not more than two hundred nanometers from the ABS, the NFT-facing surface corresponding to the pole tip and being substantially parallel to the NFT, the sloped surface being sloped at an angle of at least forty degrees and not more than fifty degrees with respect to the NFT-facing surface, the NFT-facing surface extending at least fifty nanometers and not more than two hundred nanometers from the ABS, the back surface also being at least four hundred nanometers from the core, wherein the stitch further includes a plurality of layers, each of the plurality of layers having a different moment that decreases with increasing distance from the core; and at least one coil for energizing the write pole.

15. An energy assisted magnetic recording (EAMR) disk drive comprising:

a slider;

a laser for providing energy; and an EAMR head coupled with the slider and receiving the energy, the EAMR head having an air-bearing surface (ABS) configured to reside in proximity to a media during use, the EAMR head including at least one waveguide, a near-field transducer (NFT) coupled with the waveguide, a write pole, and at least one coil, the at least one waveguide for directing the energy from the laser toward the ABS, the NFT for focusing the energy onto the media, the a write pole including a stitch for providing a magnetic field to the media and a yoke coupled to the stitch, the stitch including an ABS-facing surface, a sloped surface, and a NFT-facing surface between the ABS-facing surface and the sloped surface, the NFT-facing surface being substantially parallel to the NFT, the sloped surface being sloped at an angle of at least twenty-five degrees and not more than sixty-five degrees with respect to the NFT-facing surface, the at least one coil for energizing the write pole.

16. A method for providing an energy assisted magnetic recording (EAMR) head coupled with a laser for providing energy and having an air-bearing surface (ABS) configured to reside in proximity to a media during use, the method comprising:

providing at least one waveguide for directing the energy from the laser toward the ABS;

providing a near-field transducer (NFT) coupled with the waveguide for focusing the energy onto the media;

providing a write pole including a stitch for providing a magnetic field to the media and a yoke coupled to the stitch, the stitch including an ABS-facing surface, a sloped surface, and a NFT-facing surface between the ABS-facing surface and the sloped surface, the NFT-facing surface being substantially parallel to the NFT, the sloped surface being sloped at an angle of at least twenty-five degrees and not more than sixty-five degrees with respect to the NFT-facing surface; and providing at least one coil for energizing the write pole.

17. The method of claim 16 wherein the angle is at least forty degrees and not more than fifty degrees.

18. The method of claim 16 wherein NFT-facing surface extends at least fifty and not more than two hundred nanometers from the ABS.

19. The method of claim 16 wherein the step of providing the write pole further includes:

providing a back pedestal and a return pole, the stitch being coupled to the back pedestal through the yoke.

20. The method of claim 16 wherein the stitch further includes a nose and a flared region, the nose meeting the flared region at a flare point, the NFT facing surface meeting the sloped surface at a throat height, the throat height being the same as the flare point.

21. The method of claim 16 wherein the stitch further includes a nose and a flared region, the nose meeting the flared region at a flare point, the NFT facing surface meeting the sloped surface at a throat height, the throat height being different from the flare point.

22. The method of claim 16 wherein the stitch further includes a nose and a flared region, the nose meeting the flared region at a flare point, the flare point being at least fifth nanometers and not more than two hundred nanometers from the ABS.

23. The method of claim 16 wherein the stitch includes a back surface, the sloped surface residing between the back surface and the NFT-facing surface, the back surface being substantially parallel to the waveguide, the back surface also being at least four hundred and not more than eight hundred nanometers from the waveguide.

24. The method of claim 16 wherein the stitch includes a plurality of moments.

25. The method of claim 24 wherein the stitch includes a plurality of layers, each of the plurality of layers having a moment of the plurality of moments, a first layer being disposed at a leading edge of the write pole, the first layer including the NFT-facing surface and the sloped surface, the first layer having a highest moment of the plurality of moments.

26. The method of claim 25 wherein the moment of each of the plurality of layers decreases with increasing distance from the leading edge.

27. The method of claim 16 wherein the waveguide further includes a parabolic solid immersion mirror.

28. The method of claim 16 further comprising:

providing a nonmagnetic connecting material residing between the NFT and the write pole, the nonmagnetic connecting material having a high thermal conductivity.

* * * * *